(12) United States Patent
Narushima et al.

(10) Patent No.: US 8,909,964 B2
(45) Date of Patent: Dec. 9, 2014

(54) POWER SUPPLY CONTROL APPARATUS FOR SELECTIVELY CONTROLLING A STATE OF A PLURALITY OF PROCESSING UNITS IN AN IMAGE PROCESSING APPARATUS ACCORDING TO SENSORS THAT DIRECT A MOBILE BODY

(75) Inventors: Kazuhiko Narushima, Kanagawa (JP); Motofumi Baba, Kanagawa (JP); Masafumi Ono, Kanagawa (JP); Kenji Kuroishi, Kanagawa (JP); Keiko Shiraishi, Kanagawa (JP); Kenta Ogata, Kanagawa (JP); Kouichi Azuma, Kanagawa (JP); Hidenori Horie, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 398 days.

(21) Appl. No.: 13/354,122

(22) Filed: Jan. 19, 2012

(65) Prior Publication Data
US 2013/0057894 A1 Mar. 7, 2013

(30) Foreign Application Priority Data
Sep. 6, 2011 (JP) ................................. 2011-194335

(51) Int. Cl.
G06F 1/32 (2006.01)
G03G 15/00 (2006.01)
H04N 1/23 (2006.01)
H04N 1/00 (2006.01)

(52) U.S. Cl.
CPC ........ G03G 15/5004 (2013.01); H04N 1/00904 (2013.01); H04N 1/00928 (2013.01); G03G 15/5016 (2013.01); H04N 1/00323 (2013.01); H04N 1/00798 (2013.01); H04N 1/00082 (2013.01); G03G 2215/00109 (2013.01); H04N 1/00037 (2013.01); H04N 1/00896 (2013.01); H04N 1/0005 (2013.01); H04N 2201/0094 (2013.01); H04N 1/00395 (2013.01); H04N 1/2307 (2013.01)
USPC .......................................... 713/323; 713/320

(58) Field of Classification Search
CPC ....... G06F 1/32; G06F 1/3206; G06F 1/3231; H04N 1/32673; H04N 1/00925
USPC .................................................. 713/320, 323
See application file for complete search history.

(56) References Cited

U.S. PATENT DOCUMENTS

| | | | | |
|---|---|---|---|---|
| 5,822,077 A | * | 10/1998 | Sasaki et al. | 358/296 |
| 6,577,825 B1 | * | 6/2003 | Gonnella et al. | 399/38 |
| 6,842,593 B2 | * | 1/2005 | Cannon | 399/81 |
| 7,844,193 B2 | * | 11/2010 | Takagi et al. | 399/77 |
| 2010/0150600 A1 | * | 6/2010 | Oyoshi | 399/88 |
| 2010/0231390 A1 | * | 9/2010 | Hashimoto | 340/573.1 |
| 2012/0127538 A1 | * | 5/2012 | Mamiya et al. | 358/442 |

FOREIGN PATENT DOCUMENTS

| | | |
|---|---|---|
| JP | 05-045471 A | 2/1993 |
| JP | 2002-071833 A | 3/2002 |

* cited by examiner

*Primary Examiner* — Chun Cao
(74) *Attorney, Agent, or Firm* — Sughrue Mion, PLLC

(57) ABSTRACT

Disclosed is a power supply control apparatus including plural processing units, a mobile body detection unit, a determination unit, a transition unit, a mobile body confirmation unit, and a controller that controls the transition unit such that states of all of the processing units transit to the powered-off state when a result of confirmation in the mobile body confirmation unit represents absence and controls the transition unit such that the states of the plural processing units selectively and individually transit to the powered-off state when a result of confirmation in the mobile body confirmation unit represents presence.

20 Claims, 10 Drawing Sheets

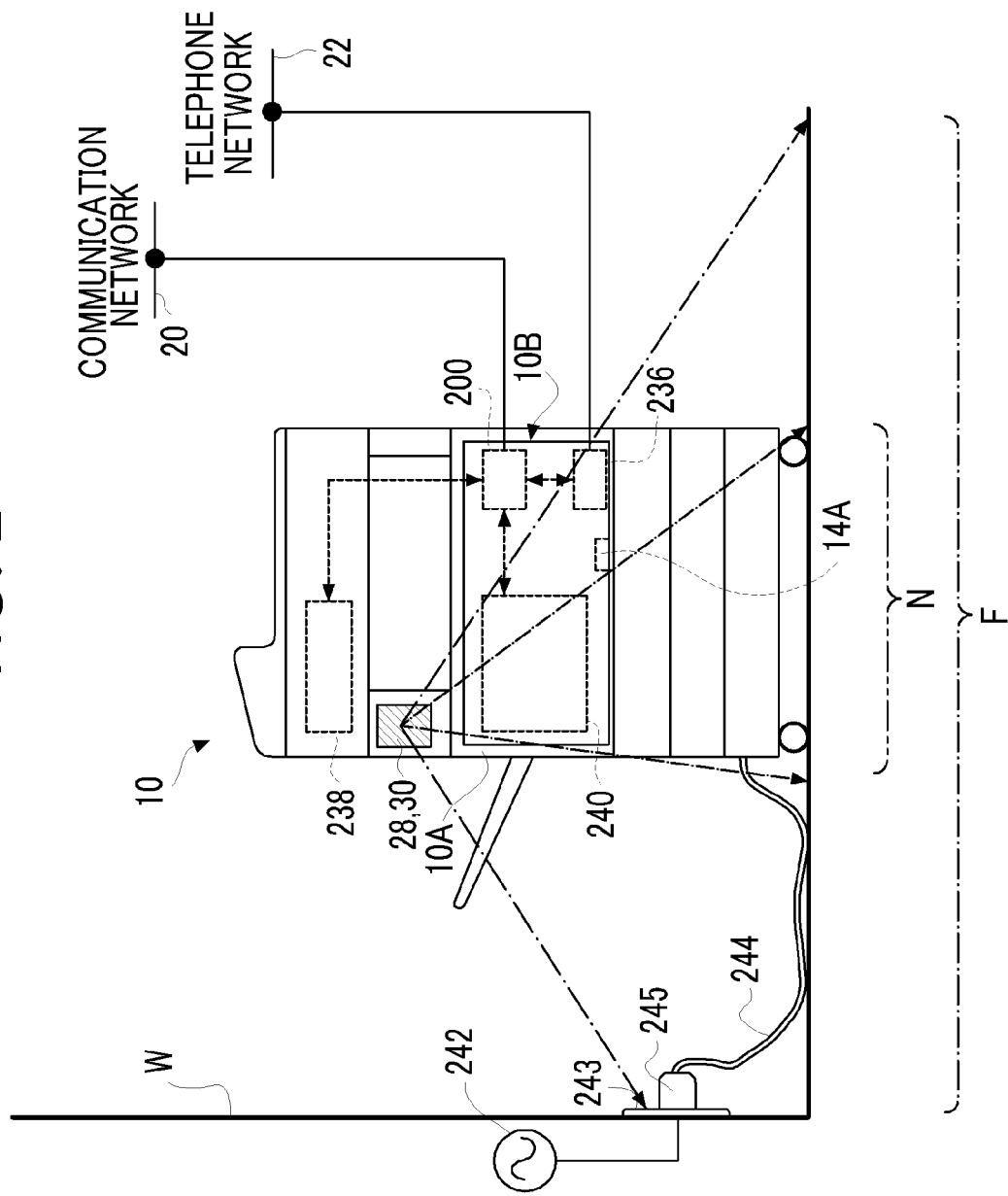

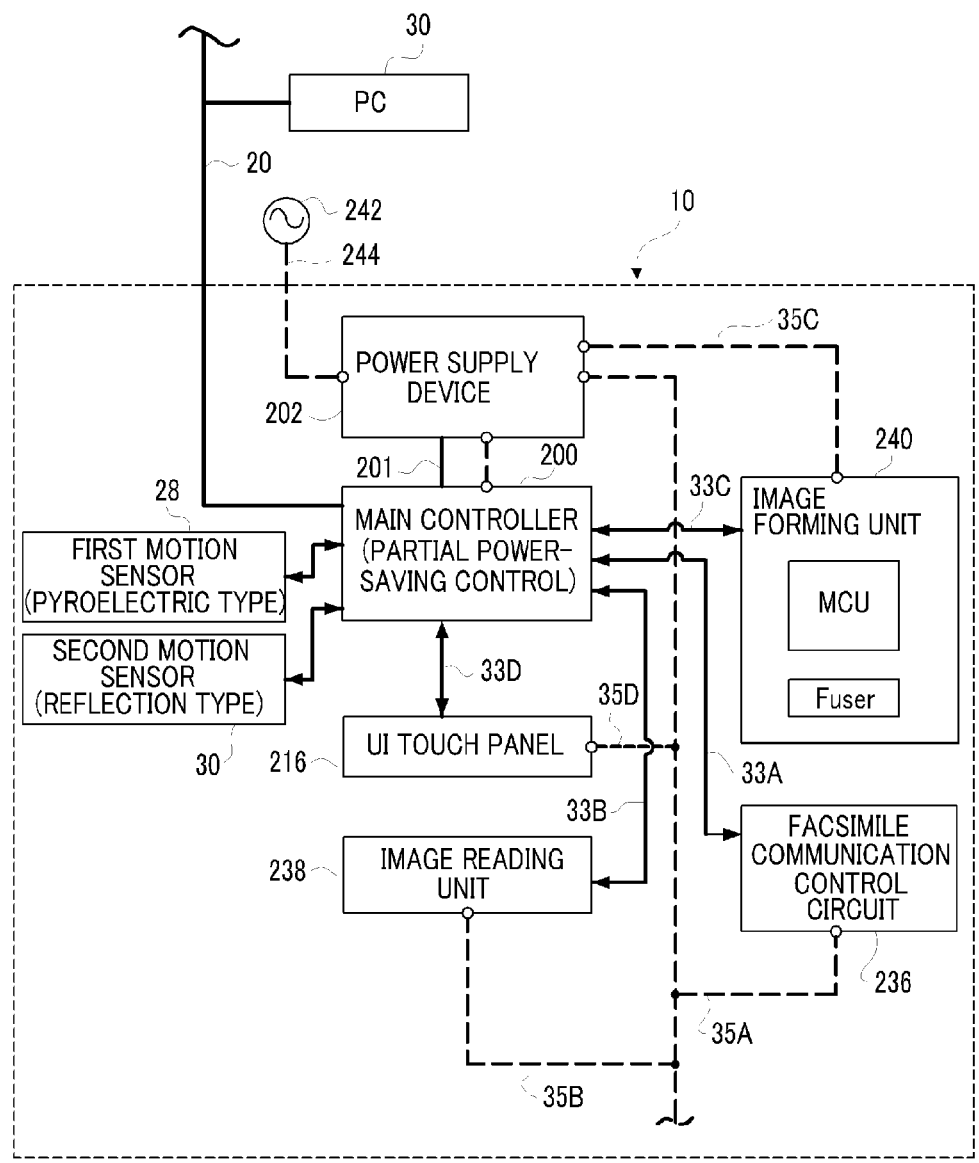

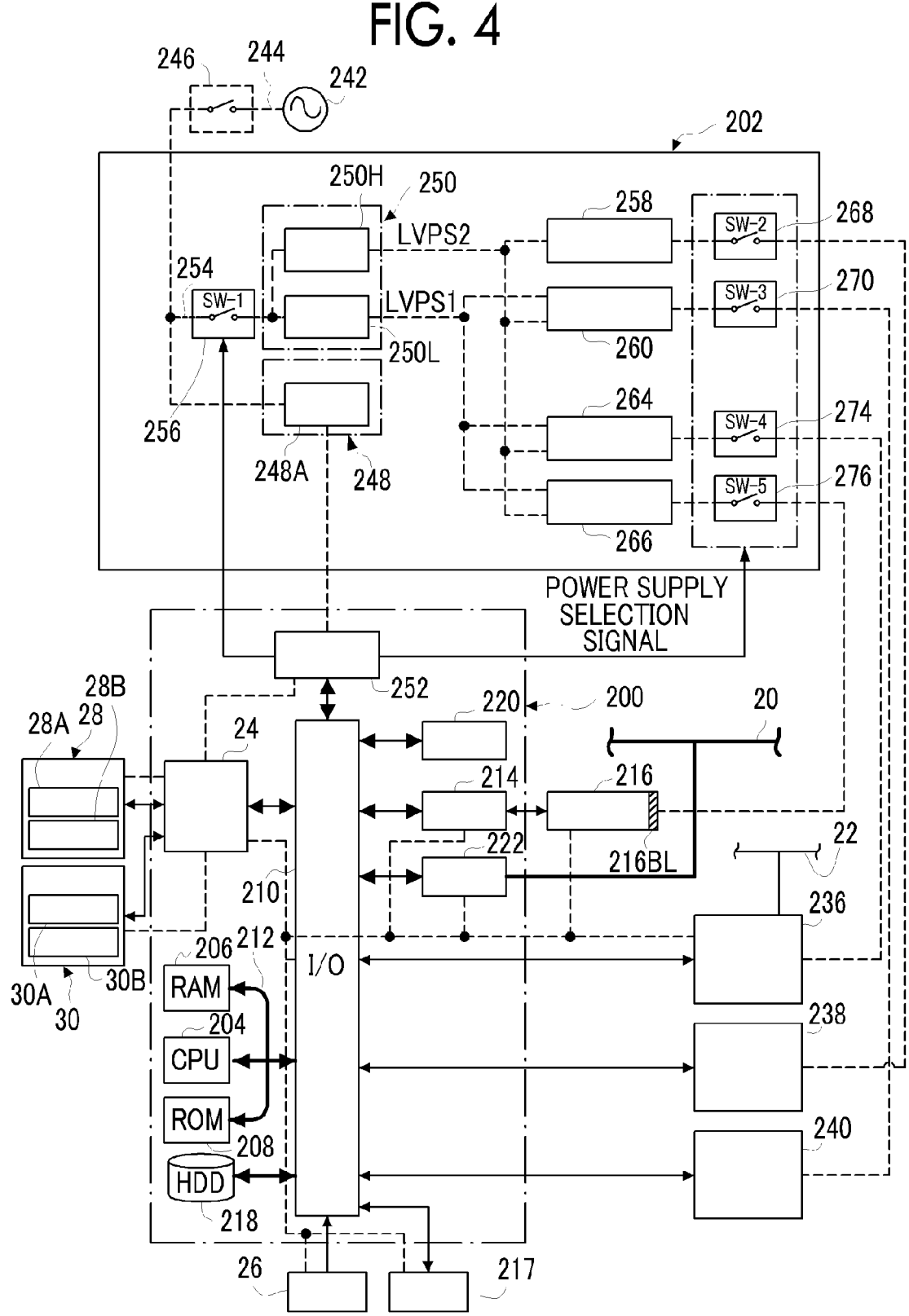

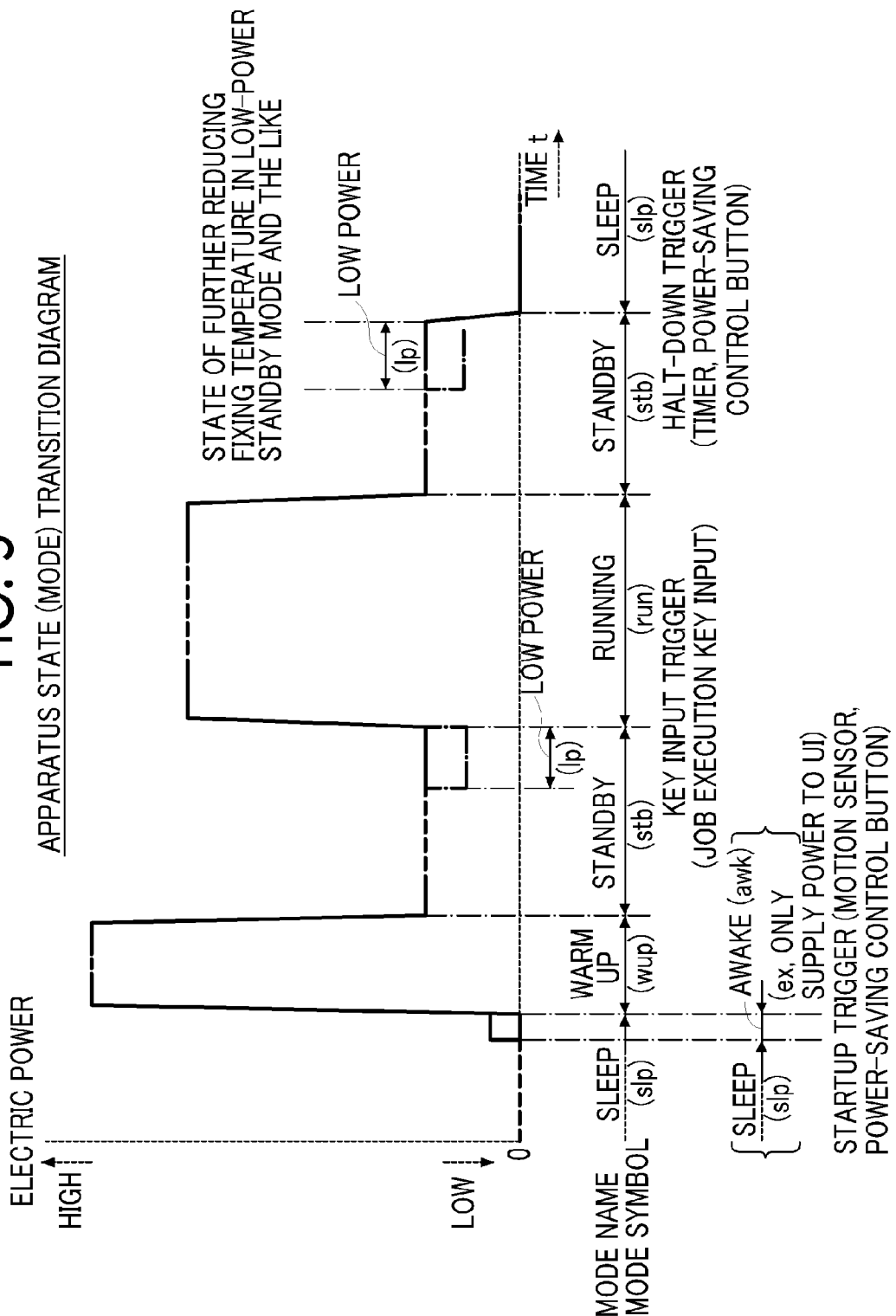

FIG. 6

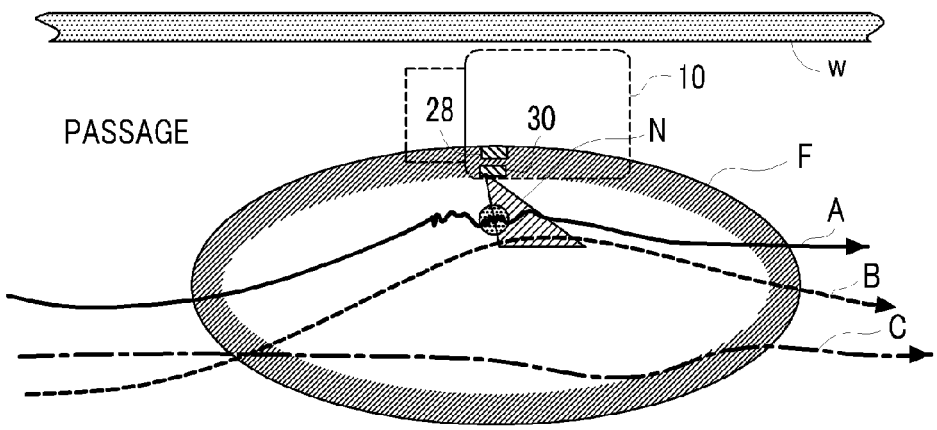

A ⟶ MOVEMENT TRACE IN CASE WHERE PERSON APPROACHES OPERATIONAL POSITION OF IMAGE PROCESSING APPARATUS, STOPS TO PERFORM MANIPULATION FOR USE, AND RECEDES.
MOVING AREA (OUTSIDE AREA→ AREA F →AREA N →AREA F OUTSIDE AREA)

B --▶ MOVEMENT TRACE IN CASE WHERE PERSON APPROACHES OPERATIONAL POSITION OF IMAGE PROCESSING APPARATUS AND PASSES.
MOVING AREA (OUTSIDE AREA→ AREA F→ AREA N → AREA F OUTSIDE AREA)

C --▶ MOVEMENT TRACE IN CASE WHERE PERSON DOES NOT APPROACH OPERATIONAL POSITION OF IMAGE PROCESSING APPARATUS AND PASSES THROUGH VICINITY THEREOF.
MOVING AREA (OUTSIDE AREA→AREA F→OUTSIDE AREA)

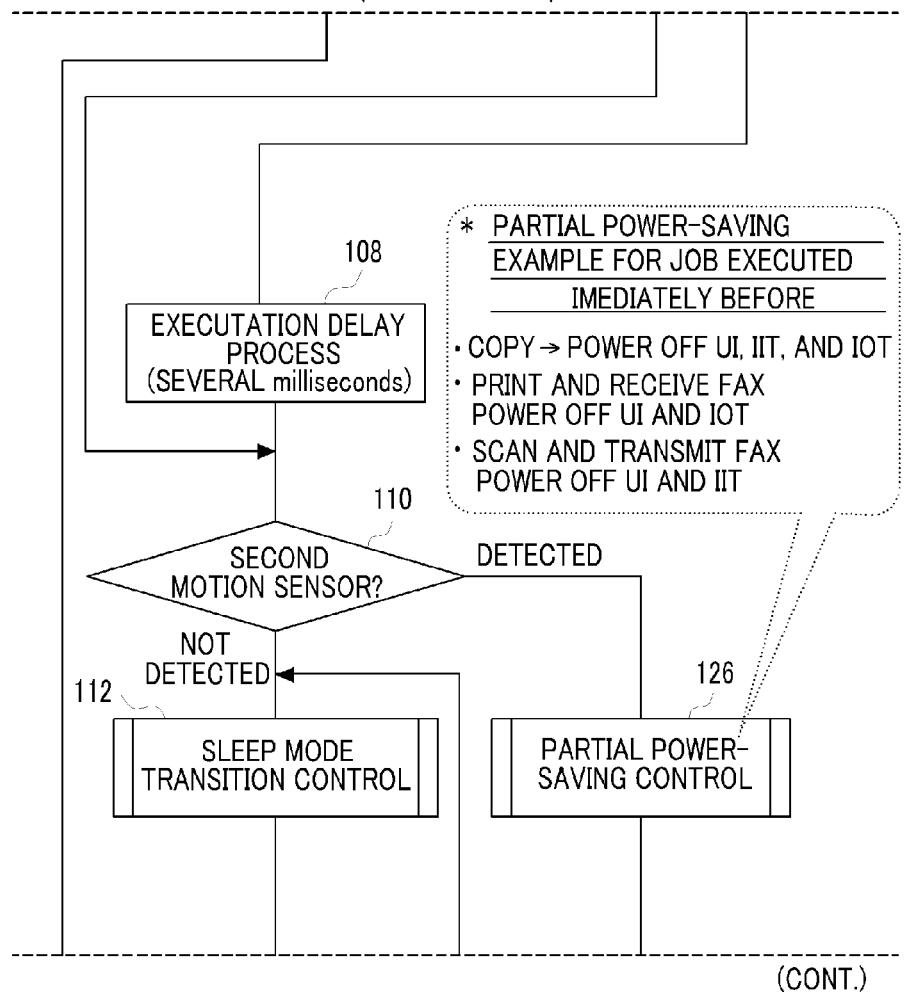

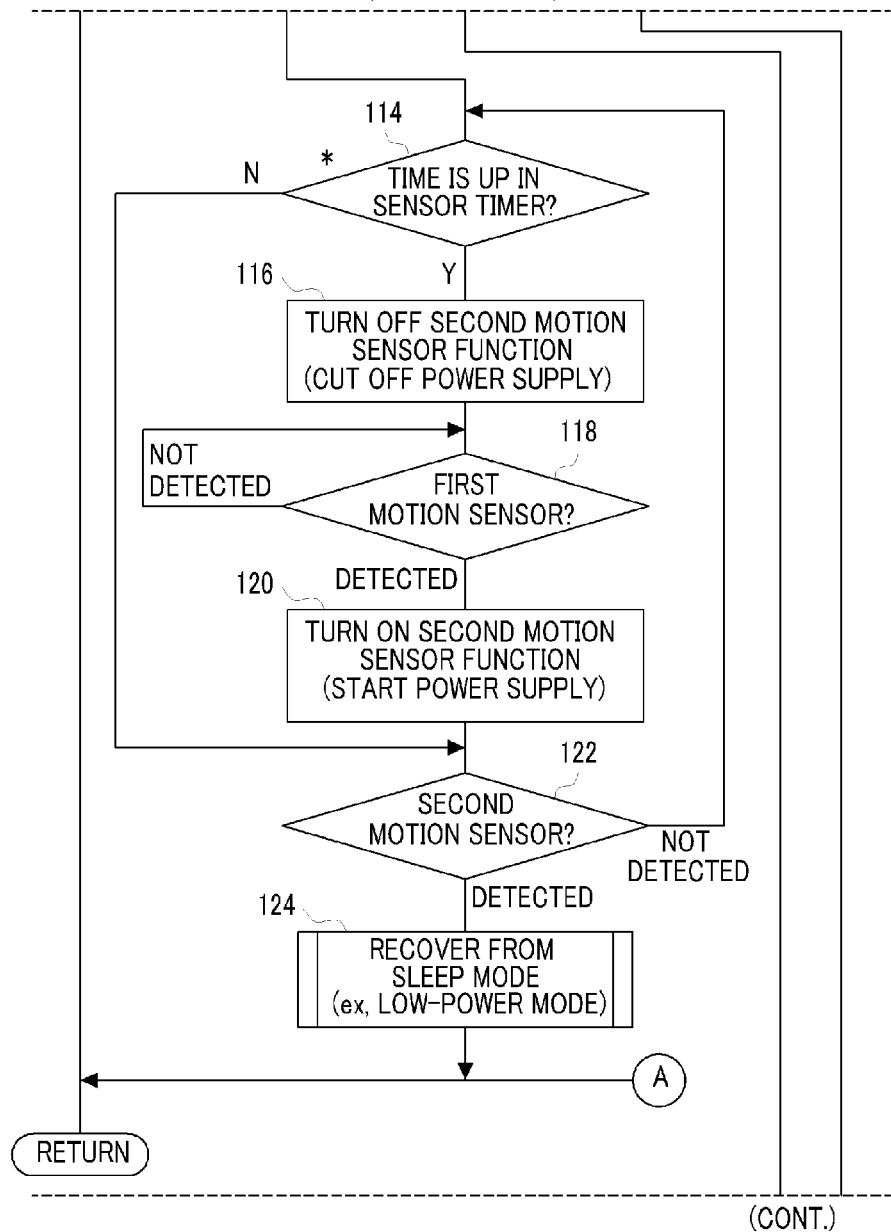

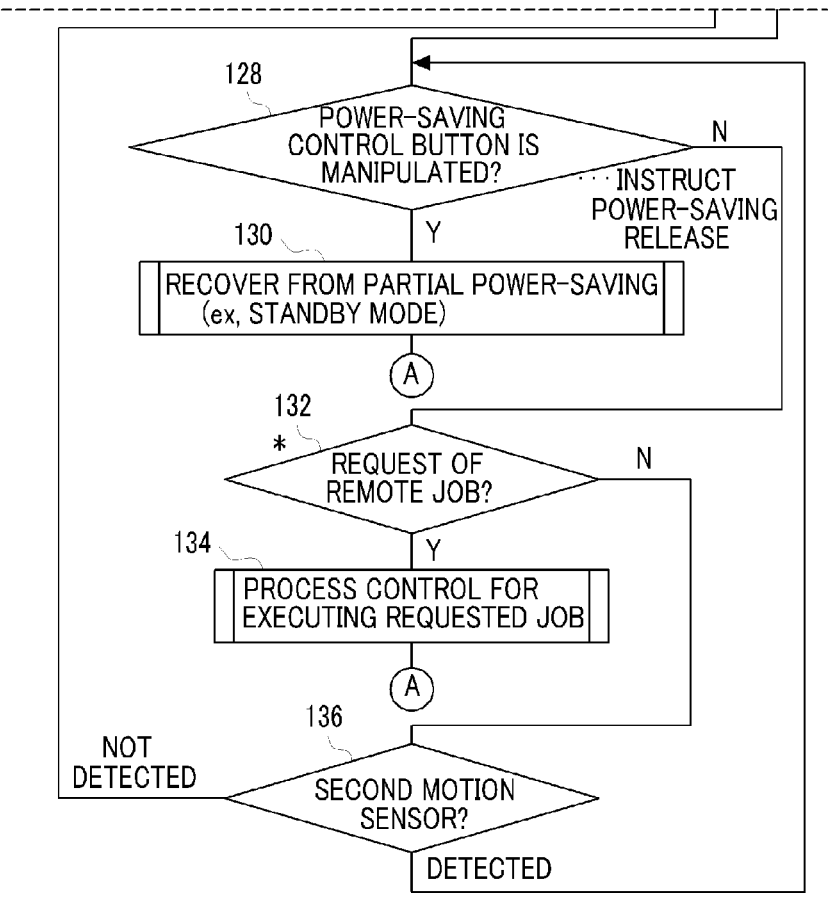

POWER SUPPLY CONTROL APPARATUS FOR SELECTIVELY CONTROLLING A STATE OF A PLURALITY OF PROCESSING UNITS IN AN IMAGE PROCESSING APPARATUS ACCORDING TO SENSORS THAT DIRECT A MOBILE BODY

CROSS-REFERENCE TO RELATED APPLICATIONS

This application is based on and claims priority under 35 USC 119 from Japanese Patent Application No. 2011-194335 filed Sep. 6, 2011.

BACKGROUND (i) Technical Field

The invention relates to a power supply control apparatus, an image processing apparatus, and a non-transitory computer readable medium storing a power supply control program.

(ii) Related Art

A motion sensor control is known as one of a unit that automates power supply control for a power supply target apparatus (processing unit, load).

SUMMARY

According to an aspect of the invention, there is provided a power supply control apparatus including: plural processing units activated when power is supplied from a power supply unit to execute a predetermined process; a mobile body detection unit that detects a mobile body including a user who uses the processing unit by setting in advance a position of the processing unit as a reference position; a determination unit that determines presence/absence of the mobile body confronting the processing unit based on a signal output from the mobile body detection unit; a transition unit that makes the processing unit transit to a powered-on state in which the processing unit receives power from the power supply unit when the determination unit determines that the mobile is present and to a powered-off state in which the processing unit does not receive power from the power supply unit when the determination unit determines that the mobile body is absent; a mobile body confirmation unit that confirms presence/absence of the mobile body from the mobile body detection unit when there is a request for transition from the powered-on state to the powered-off state for the transition unit; and a controller that controls the transition unit such that states of all of the processing units transit to the powered-off state when a result of confirmation in the mobile body confirmation unit represents absence and controls the transition unit such that the states of the plural processing units selectively and individually transit to the powered-off state when a result of confirmation in the mobile body confirmation unit represents presence.

BRIEF DESCRIPTION OF THE DRAWINGS

Exemplary embodiments of the present invention will be described in detail based on the following figures, wherein:

FIG. 2 is a schematic diagram illustrating an image processing apparatus according to an exemplary embodiment of the invention;

FIG. 3 is a block diagram illustrating a configuration of the control system of an image processing apparatus according to an exemplary embodiment of the invention;

FIG. 4 is a schematic diagram functionally illustrating the control system of the main controller and the power supply apparatus according to an exemplary embodiment of the invention;

FIG. 5 is a timing chart illustrating each mode state and an event serving as momentum for transition of the mode state in the image processing apparatus;

FIG. 6 is a plan view illustrating the image processing apparatus and the surrounding thereof according to an exemplary embodiment of the invention.

DETAILED DESCRIPTION

Figure 1:
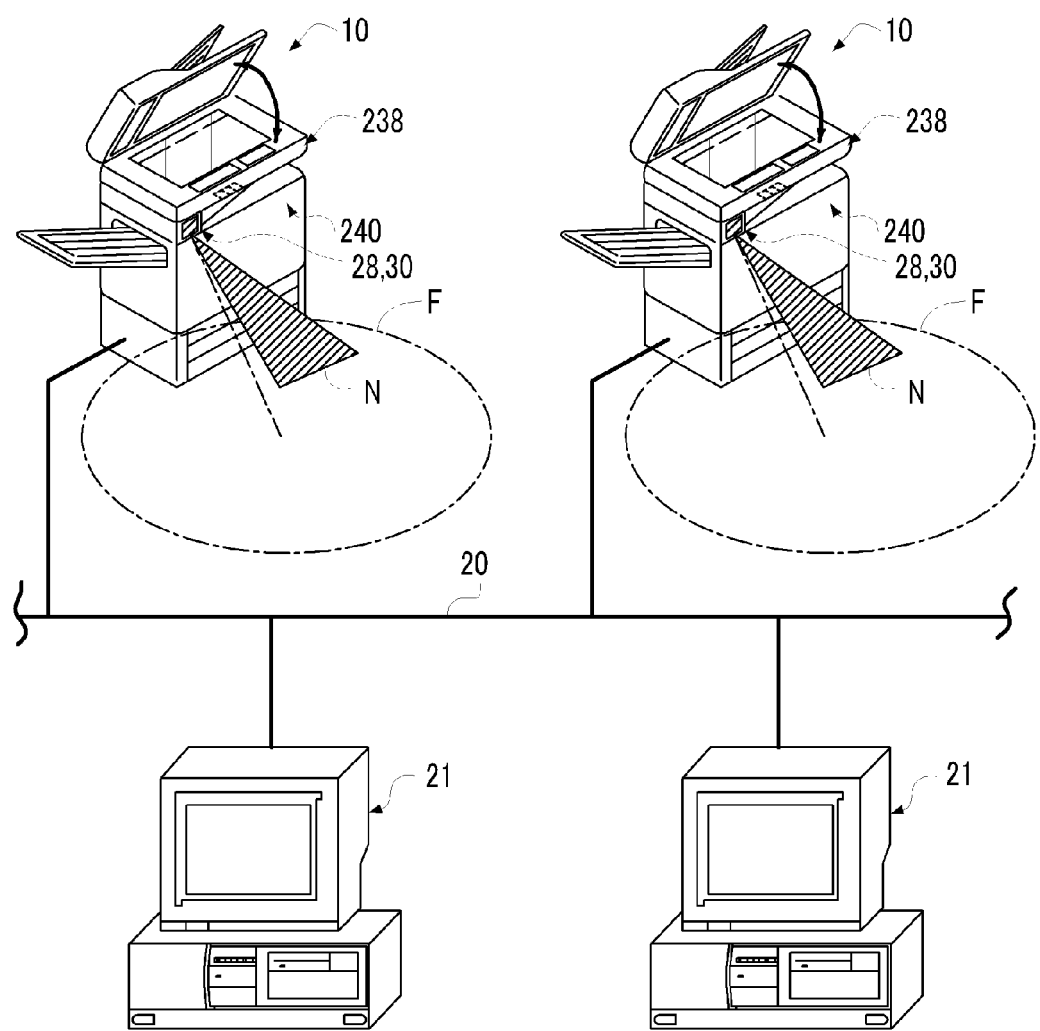
FIG. 1 is a connection diagram illustrating a communication network including an image processing apparatus according to an exemplary embodiment of the invention.

As shown in FIG. 1, an image processing apparatus 10 according to an exemplary embodiment of the invention is connected to a communication network 20 such as the Internet. Although two image processing apparatuses 10 are connected in FIG. 1, the number of apparatuses 10 is not limited thereto and may be one, or three or more.

In addition, in the communication network 20, plural PCs (personal computers) 21 are connected as an information terminal apparatus. In FIG. 1, although two of the PCs 21 are connected, the number of the PCs 21 is not limited thereto and may be one, or three or more. The information terminal apparatus is not limited to PC 21 and is not necessarily connected in a wired manner. That is, the information terminal apparatus may be a communication network capable of transmitting and receiving information in a wireless manner.

As shown in FIG. 1, in the image processing apparatus 10, there is a case where the image forming (print) instruction is manipulated by, for example, transmitting data under the remote control regarding the image processing apparatus 10 from the PC 21 or a case where the processing such as duplication (copy), scan (image reading), or facsimile transmission/receipt is instructed by a variety of manipulating operations while a user is placed in front of the image processing apparatus 10.

FIG. 2 illustrates an image processing apparatus 10 according to an exemplary embodiment of the invention.

The image processing apparatus 10 includes an image forming unit 240 for forming an image to recording paper, an image reading unit 238 for reading a document image, and a facsimile communication control circuit 236. The image processing apparatus 10 includes a main controller 200 and primarily stores the image data of the document image read from the image reading unit 238 by controlling the image forming unit 240, the image reading unit 238, and the facsimile communication control circuit 236 and feeds the read image data to the image forming unit 240 or the facsimile communication control circuit 236.

The communication network 20 such as the Internet is connected to the main controller 200, and the telephone network 22 is connected to the facsimile communication control circuit 236. For example, the main controller 200 is connected to a host computer through the communication network 20 to receive the image data and has the role of executing a facsimile receipt or transmission using the telephone network 22 through the facsimile communication control circuit 236.

The image reading unit 238 is provided with a platen for determining the position of the document, a scanning drive system for irradiating light by scanning an image of the document placed in the platen, a photoelectric conversion element such as a CCD for receiving the reflection or transmission light through the scanning of the scanning drive system and converting the light into electrical signal.

The image forming unit 240 includes a photosensitive body. In the vicinity of the photosensitive body, there are provided a charging device for uniformly charging the photosensitive body, a scanning exposure unit for scanning the optical beam based on image data, an image development unit for developing an electrostatic latent image formed through the exposed scanning depending on the scanning exposure unit, a transfer unit for transferring the developed image on the photosensitive body to the recording paper, and a cleaning unit for cleaning the surface of the photosensitive body after the transfer. In addition, the recording paper feeding path of the recording paper includes a fixing unit for fixing the image on the recording paper after the transfer.

In the image processing apparatus 10, a power outlet 245 is installed in the leading edge of an input power supply line 244. Power is supplied to the image processing apparatus 10 from a commercial power supply 242 by inserting the power outlet 245 into a wiring plate 243 of a commercial power supply 242 connected to a wall surface W.

(Control System Hardware Configuration of Image Processing Apparatus)

FIG. 3 is a diagram view illustrating a hardware configuration of the control system in the image processing apparatus 10.

The communication network 20 is connected to the main controller 200. The main controller 200 is connected to the facsimile communication control circuit 236, the image reading unit 238, the image forming unit 240 and a UI touch panel 216 through buses 33A to 33D such as a data bus or a control bus. That is, this main controller 200 serves as the main body for controlling each processing unit of the image processing apparatus 10. In addition, a backlight unit (refer to FIG. 4) used in the UI touch panel may be attached to the UI touch panel 216.

The image processing apparatus 10 includes a power supply apparatus 202 and is connected to the main controller 200 in a signal harness 201. The power supply apparatus 202 is powered by the commercial power supply 242. The power supply apparatus 202 is provided with power supply lines 35A to 35D for independently supplying power to each of the main controller 200, the facsimile communication control circuit 236, the image reading unit 238, the image forming unit 240, and the UI touch panel 216. As a result, the main controller 200 is capable of so-called partial power-saving control by separately powering on (power supply mode) or powering off (sleep mode) each processing unit (device).

The main controller 200 is connected to two motion sensors including first and second motion sensors 28 and 30 and monitors whether or not a person is present in the vicinity of the image processing apparatus 10. The first and second motion sensors 28 and 30 will be described below.

(Functional Block Diagram Illustrating Partial Power-saving Configuration To be Main)

FIG. 4 is a schematic configuration diagram illustrating processing units (also referred to as "device," "module," and the like) controlled by the main controller 200, the main controller 200, and a power supply line of the power supply apparatus 202 to be main in order to supply power to each device. According to an exemplary embodiment of the invention, the image processing apparatus 10 may be powered on/off in the unit of the processing unit (partial power-saving).

In addition, partial power-saving in the unit of the processing unit is exemplary. Power-saving may be controlled in the group unit by dividing the processing units into several groups, or the power-saving of the processing units may be collectively controlled.

(Main Controller 200)

As shown in FIG. 4, the main controller 200 includes a CPU 204, a RAM 206, a ROM 208, an I/O (input/output unit) 210, and a bus 212 such as a data bus or a control bus for connection thereof. The I/O 210 is connected to the UI touch panel 216 (including a backlight unit 216BL) through a UI control circuit 214. In addition, a hard disk (HDD) 218 is connected to the I/O 210. A function of the main controller 200 is implemented by operating the CPU 204 based on a program recorded in the ROM 208, the hard disk 218, or the like. In addition, the image processing function may be implemented by installing the program from a readable medium (CD, DVD, BD (Blue-ray Disc), USB memory, SD memory, and the like) in which the corresponding program is stored and operating the CPU 204 based on the installed program.

A timer circuit 220 and a communication line I/F 222 are connected to the I/O 210. In addition, the I/O 210 is connected to each of devices such as the facsimile communication control circuit (modem) 236, the image reading unit 238, and the image forming unit 240.

The timer circuit 220 counts time as a momentum for setting the power-saving state (powered-off state) in the facsimile communication control circuit 236, the image reading unit 238, and the image forming unit 240 (hereinafter, also referred to as a "system timer").

The main controller 200 and each of devices (the facsimile communication control circuit 236, the image reading unit 238, the image forming unit 240) receive power from the power supply apparatus 202 (refer to the dashed line in FIG. 4). In FIG. 4, although the power supply line is depicted as a line (dashed line), the power supply line includes two or three lines in practice.

(Power Supply Apparatus 202)

As shown in FIG. 4, the input power supply line 244 pulled from the commercial power supply 242 is connected to a main switch 246. As the main switch 246 is turned on, the power may be supplied to first and second power supply units 248 and 250.

The first power supply unit 248 includes a control power generating unit 248A and is connected to a power supply control circuit 252 of the main controller 200. The power supply control circuit 252 supplies power to the main controller 200 and is connected to the I/O 210 so as to perform the switching control to connect/disconnect the power supply line to each of the devices (the facsimile communication control circuit 236, the image reading unit 238, and the image forming unit 240) depending on the control program of the main controller 200.

Meanwhile, in a power supply line 254 connected to the second power supply unit 250, a first subsidiary power switch 256 (hereinafter, also referred to as "SW-1") is interposed. SW-1 is turned on/off under control of the power supply control circuit 252.

The second power supply unit 250 includes a 24 V power supply unit 250H (LVPS2) and a 5 V power supply unit 250L (LVPS1). The 24 V power supply unit 250H (LVPS2) is a power supply mainly used in the motor, and the like.

The 24 V power supply unit 250H (LVPS2) and the 5 V power supply unit 250L (LVPS1) of the second power supply unit 250 are selectively connected to an image reading unit power supply unit 258, an image forming unit power supply unit 260, a facsimile communication control circuit power supply unit 264, and an UI touch panel power supply unit 266.

An image reading unit power supply unit 258 is connected to the image reading unit 238 through a second subsidiary power switch 268 (hereinafter, referred to as "SW-2") by using the 24 V power supply unit 250H (LVPS2) as an input source.

An image forming unit power supply unit 260 is connected to the image forming unit 240 through a third subsidiary power supply switch 270 (hereinafter, referred to as "SW-3") by using the 24 V power supply unit 250H (LVPS2) and the 5 V power supply unit 250L (LVPS1) as an input source.

A facsimile communication control circuit power supply unit 264 is connected to the facsimile communication control circuit 236 and the image forming unit 240 through a fourth subsidiary power supply switch 274 (hereinafter, referred to as "SW-4") by using the 24 V power supply unit 250H (LVPS2) and the 5 V power supply unit 250L (LVPS1) an input source.

A UI touch panel power supply unit 266 is connected to the UI touch panel 216 (including the backlight unit 216BL) through a fifth subsidiary power supply switch 276 (hereinafter, referred to as "SW-5") by using the 5 V power supply unit 250L (LVPS1) and the 24 V power supply unit 250H (LVPS2) as an input source. In addition, the original function (functions except for the backlight unit 216BL) of the UI touch panel 216 may include a function of supplying power from a power-saving monitoring/control unit 24.

Similar to the first subsidiary power supply switch 256, the second subsidiary power supply switch 268, the third subsidiary power supply switch 270, the fourth subsidiary power supply switch 274, and the fifth subsidiary power supply switch 276 are controlled to turn on/off based on the power supply selection signal from the power supply control circuit 252 of the main controller 200. Although not shown in the drawings, the switch or the wire line for supplying the 24 V power supply unit 250H and the 5 V power supply unit 250L has two channels. The power supply switches 268 to 276 may be arranged in each of devices of the power supply destination instead of the power supply apparatus 202.

In the configuration described above, power is supplied by selecting each of devices (facsimile communication control circuit 236, image reading unit 238, and image forming unit 240) on a function basis, and power is not supplied to the device unnecessary for the instructed function, so that the process is finished at the necessary minimum power.

(Monitoring Control for State Transition of Image Processing Apparatus)

Here, the functions of the main controller 200 according to an exemplary embodiment of the invention may partially halt to reduce the power consumption to a necessary minimum level in some cases. Alternatively, supply of power to most of the main controller 200 may halt in some cases. This is generally called a "sleep mode" (refer to FIG. 5).

For example, the state may transit to the sleep mode by activating a system timer when the image processing is terminated. That is, supply of power is halted when a predetermined time elapses after the system timer is activated. In addition, if manipulation (manipulation of a hardware key and the like) is made before a predetermined time elapses, the timer counting to the sleep mode is naturally terminated, and the system timer is activated from the end of the next image processing.

Meanwhile, as the element supplied with the power at all times during the sleep mode, a power-saving monitoring/control unit 24 is connected to the I/O 210. For example, the power-saving monitoring/control unit 24 stores a self-operational program in a so-called ASIC and may include an IC chip such as CPU, RAM, and ROM processed by the operational program.

However, it is assumed that power is supplied to a device in the power-saving mode when a print request is received from the communication line detection unit, or a FAX receipt request is received from the FAX line detection unit in the middle of monitoring during the power-saving mode by controlling the first subsidiary power supply switch 256, the second subsidiary power supply switch 268, the third subsidiary power supply switch 270, the fourth subsidiary power supply switch 274, and the fifth subsidiary power supply switch 276 using the power supply control circuit 252 in the power-saving monitoring/control unit 24.

A power-saving control button 26 (often referred to as a "power-saving button 26") is connected to the I/O 210 of the main controller 200, and the power-saving mode maybe released as a user manipulates this power-saving control button 26 during power-saving mode. In addition, the power-saving control button 26 is provided with a function of compulsorily cutting off supply of power of the processing unit and making the state transit to the power-saving mode when manipulation is made while power is supplied to the processing unit.

Here, in order to perform monitoring in the sleep mode, it is desirable to supply the necessary minimum power during the power-saving mode to the power-saving control button 26 or each detection unit except for the power-saving monitoring/control unit 24. That is, even in the sleep mode, which has a powered-off state, power equal to or lower than a predetermined power level (for example, equal to or less than 0.5 W) necessary to determine/control whether or not power is to be supplied may be supplied.

As a specific time period for the sleep mode, a time period for supplying the necessary minimum power may be provided to an input system such as the main controller 200, the UI touch panel 216, or IC card reader 217. This is to consider convenience of a user. In addition, in this case, it is desirable to turn off the backlight unit 216BL for the UI touch panel 216 or reduce illuminance thereof in comparison with a normal time to further ensure the energy-saving.

Although the aforementioned specific period is discriminated, for example, as a tentatively called awake mode (awk) in FIG. 5, this mode may be dispensable.

However, time may be necessary until the startup of the image processing apparatus 10 in a case where a user stands in front of the image processing apparatus 10 during the sleep mode and then manipulates the power-saving control button 26 to restart the supply of power.

In this regard, according to an exemplary embodiment of the invention, the first and second motion sensors 28 and 30 are provided in the power-saving monitoring/control unit 24, and detection is made using the motion sensor to restart supply of power at an early stage to expedite a user's job before the user presses a power-saving release button in the sleep mode. In addition, although the power-saving control button 26 is used along with the first and second motion sensors 28 and 30, the overall monitoring may be made only using the first and second motion sensors 28 and 30.

As shown in FIG. 4, the first and second motion sensors 28 and 30 include detection units 28A and 30A and circuit boards 28B and 30B, respectively. The circuit boards 28B and 30B adjust the sensitivity of the signal detected by the detection units 28A and 30A or generate the output signal.

Although the word "motion" is used in the first and second motion sensors 28 and 30, it means "at least a person is able to be sensed (detectable)" as a proper noun according to an exemplary embodiment of the invention. In other words, it may include a mobile body as well as a human being as a (sensing) detection target. Although the detection target of the motion sensor is referred to as a "person" in the following description, a robot and the like instead of a person may be included in the range of sensing target in the future. In contrast, if a special sensor capable of specifically sensing a person exists, such a sensor may also be applicable. Hereinafter, it is assumed that a mobile body, a person, a user, and the like refer to the same meaning as the detection target of the first and second motion sensors 28 and 30, and they may be distinguishably used as necessary.

(First Motion Sensor 28)

The specification of the first motion sensor 28 according to an exemplary embodiment of the invention is to detect the motion of the mobile body in the vicinity of the image processing apparatus 10 (for example, a range of 1 to 5 meters). In this case, an infrared sensor (pyroelectric sensor) and the like based on the pyroelectric effect of the pyroelectric element may be representatively used. According to the present embodiment, the pyroelectric sensor is used as the first motion sensor 28.

The greatest characteristic of the sensor based on the pyroelectric effect of the pyroelectric element applied to the first motion sensor 28 is that the detection area is large. Since the motion of the mobile body is sensed, presence of a person is not detected if the person stops in the detection area. For example, if a high-level signal is output when a person moves, the signal is changed to a low-level signal as a person stops in the detection area.

In addition, although "stop" according to an exemplary embodiment of the invention naturally includes a complete stop such as a still image taken by a still camera and the like, for example, it may include a state that a person stops in front of the image processing apparatus 10 for the purpose of manipulation. Therefore, migration within a predetermined range (such as a tiny bit during respiration) or movement of a limb, neck, or the like may be included in the category of "stop."

However, presence of a person may be detected by the motion sensor 28, for example, if the person makes a motion such as stretching in place while waiting for the processing such as image formation or image reading in front of the image processing apparatus 10.

Therefore, the sensitivity of the first motion sensor 28 may not be adjusted by defining "stop," but may be adjusted relatively roughly and formally and depends on the detection state of the first motion sensor 28. That is, when the first motion sensor 28 outputs one of the binary signal (for example, a high level signal), it may represent that a person is moving. When a person exists within the detection area of the first motion sensor 28, and the other binary signal is output (for example, a low level signal), this case may represent "stop".

A specification of the first motion sensor 28 according to an exemplary embodiment of the invention is to detect a motion of a mobile body in the vicinity of the image processing apparatus 10 (for example, a range of 1 to 5 meters).

(Second Motion Sensor 30)

Meanwhile, a specification of the second motion sensor 30 according to an exemplary embodiment of the invention is applied to detect presence/absence of a mobile body. As the sensor applied to this second motion sensor 30, a reflection-type sensor and the like including the light-transmission portion and the light-receiving portion (reflection-type sensor) may be representatively used. In addition, the light-transmission portion and the light receiving portion may be separated.

The greatest characteristic of a reflection-type sensor and the like applied to the second motion sensor 30 is to reliably detect presence/absence of a mobile body depending on whether or not the light entering into the light receiving portion is blocked. In addition, since the amount of light entering into the light receiving portion is limited depending on the amount of light and the like transmitted from the light-transmission portion, a relatively short distance is used as the detection area.

In addition, if it is possible to accomplish a function described below using the first and second motion sensors 28 and 30, it is not necessary to limit the first motion sensor 28 to the pyroelectric sensor or the second motion sensor 30 to the reflection sensor.

Here, according to an exemplary embodiment of the invention, a maximum detection range (for example, a first area F and a second area N in FIG. 6) is set by the first and second motion sensors 28 and 30.

The first area F (simply, referred to as "area F") of FIG. 6 which is a relatively remote detection area is a detection area of the first motion sensor 28 and serves as a remote mobile body detection unit. In addition, the second area N (simply, referred to as "area N") of FIG. 6 which is a relatively close detection area is a detection area of the second motion sensor 30 and serves as a close mobile body detection unit.

While the detection area of the first motion sensor 28 (refer to the first area F of FIG. 6) depends on the environment of the location in which the image processing apparatus 10 is provided, it is set to approximately 2 to 3 meters as a reference. Meanwhile, the detection area of the second motion sensor 30 (refer to the second area N of FIG. 6) is a range within which the UI touch panel 216 of the image processing apparatus 10 or a hardware key may be manipulated and is approximately set to 0 to 0.5 meters as the reference.

(Sensor Power Supply Control)

According to an exemplary embodiment of the invention, the second motion sensor 30 is not supplied with power at all times. The second motion sensor 30 starts the operation by receiving power when a mobile body (user) enters the first area F of FIG. 6 in which the first motion sensor 28 has jurisdiction. Then, the startup to the standby mode from the sleep mode is instructed when a mobile body (user) enters the second area N of FIG. 6 in which the second motion sensor 30 has jurisdiction.

That is, two motion sensors (first and second motion sensors 28 and 30) having different detection areas receive the minimum necessary power in cooperation.

Meanwhile, the timer function provided in the power-saving monitoring/control unit 24 is overlappingly used to cut off supply of power to the second motion sensor 30 in addition to the mobile body detection condition of the first motion sensor 28. This timer function is sometimes referred to as a "sensor timer" to be distinguished from the aforementioned system timer.

The sensor timer is one of the functions of the power-saving monitoring/control unit 24. That is, the control system naturally includes the operation clock and may generate the timer from this clock signal or may generate the counter program capable of periodically counting time on each-processing basis.

As shown in FIG. 6, a relationship between the mobile body (user) and the image processing apparatus 10 is widely divided into three patterns. In the first pattern, a person reaches the manipulation position to use the image processing apparatus 10 (refer to a movement pattern (A pattern) indicated by the line A in FIG. 6). In the second pattern, a person is not intended to use the processing apparatus but reaches the manipulation position (refer to a movement pattern (B pattern) indicated by the line B in FIG. 6). In the third pattern, a person does not reach the manipulation position of the processing apparatus, but approaches within a distance where there is a possibility to transit to the first and second patterns (refer to a movement pattern (C pattern) indicated by the line C in FIG. 6).

According to an exemplary embodiment of the invention, the powered-on time and the powered-off time of the second motion sensor 30 are controlled depending on the movement pattern (the movement pattern of a person including the patterns A to C of FIG. 6) based on the detection information from the first motion sensor 28 and the timing information of the sensor timer.

(Power Supply Control When Power-saving Control Button is Manipulated)

According to an exemplary embodiment of the invention, as the state transits to the standby mode, the system timer is activated. If a predetermined time elapses in the system timer, the state automatically transits to the sleep mode.

However, the image processing apparatus 10 is provided with a power-saving control button 26 separately from transition to the sleep mode caused by the system timer. As a user (here, an operator of the power-saving control button 26) confronting the image processing apparatus 10 manually manipulates (for example, presses) the power-saving control button 26, control is performed such that the state compulsorily transits to the sleep mode.

However, If a user is present in the vicinity of the image processing apparatus 10 (in the detection area of the second motion sensor 30) when the sleep mode transition is instructed by the system timer or through manipulation of the power-saving control button 26, recovery from the sleep mode may be instructed by detecting the mobile body (user) using the second motion sensor 30, and the state may not transit to a mode desired by a user.

For example, when the power-saving control button 26 is manipulated, the detection signal of the second motion sensor 30 may be invalidated for a predetermined time period (for example, about 2 to 10 seconds), and the function of the second motion sensor 30 may be recovered (invalidation period is terminated) after a user who manipulates the power-saving control button 26 recedes from the image processing apparatus 10 in order to prepare detection of the next mobile body.

However, for example, even when time is up in the system timer, or the detection of the second motion sensor 30 for an operator of the power-saving release button 26 is avoided by setting the invalidation time period, and the state transits to the sleep mode, the image processing apparatus 10 is not used by itself. However, for example, there maybe a user who extracts, checks, or arranges copied sheets at the leading edge of the discharge tray and the like.

In this case, it is likely that the state is recovered to the standby mode in order to detect a mobile body using the motion sensor 30 again even when the image processing apparatus 10 is not used.

According to an exemplary embodiment of the invention, when time is up in the system timer, or transition to the sleep mode is instructed through manipulation of the power-saving control button 26, a satisfaction both convenience and energy-saving is made to perform control such that the mode transition, for example, not intended by a user is avoided.

By performing control as described above according to an exemplary embodiment of the invention, the following functions are obtained.

(Function 1) The second motion sensor 30 remains validated before the state transits to the sleep mode (an invalidation period is not established).

(Function 2) The content of the latest job executed before transition to the sleep mode is instructed is recognized.

(Function 3) At least the power supply or powered off of devices including the UI touch panel 216, the image reading apparatus 238, and the image forming apparatus 240 may independently execute (partial power-saving).

(Function 4) Power-saving is partially performed for devices base on the job recognized by the function 2 and the sleep mode transition instruction.

(Function 5) The partial power-saving is maintained while a user is continuously detected by the second motion sensor 30. In addition, as a predetermined time elapses, the functions of the first and second sensors 28 and 30 may be temporarily halted, and the state may compulsorily transit to the sleep mode even when a user is continuously detected. In order to make a satisfaction both convenience and energy-saving, the predetermined time may be set based on a priority therebetween (the predetermined time is set to be longer if convenience has a higher priority than power-saving). For example, if convenience has a higher priority, the predetermined time may be set to 10 to 15 minutes. If energy-saving has a higher priority, the predetermined time maybe set to 2 to 5 minutes. In this manner, the predetermined time may be set by a user.

Hereinafter, the effects of an exemplary embodiment of the invention will be described.

(Mode Transition in Power Supply Control of Image Processing Apparatus 10 (Device))

First, FIG. 5 is a timing chart illustrating each mode state and an event serving as the momentum for transition to each mode state in the image processing apparatus 10.

If there is no processing in the image processing apparatus 10, the operational state transits to the sleep mode, and power is only supplied to the power-saving monitoring/control unit 24 according to the exemplary embodiment of the invention.

Here, if there is a startup momentum (detection of the startup trigger or manipulation of the power-saving control button 26 or the like), the operational state transits to the warm-up mode.

In addition, after the startup trigger momentum, the state may be defined as still the sleep mode, and the UI touch panel 216 may be only activated assuming that power is supplied to the main controller 200. Otherwise, since the power supply amount increases in comparison with the power supplied only to the power-saving monitoring/control unit 24 due to activation of the main controller 200 and the UI touch panel 216, the state maybe defined as, tentatively called, an awake mode "awk" (or wake-up mode) (refer to the inner side of the bracket [ ] of the sleep mode range in the transition diagram of FIG. 5). In this awake mode, if there is a manipulation input (key input) using the UI touch panel 216 and the like, the operation state transits to the warm-up mode.

In general, the aforementioned "startup trigger" includes a signal or information based on the detection result of the second motion sensor 30. In addition, the power-saving release manipulation from an operator maybe called the startup trigger. Since a job is determined in a case where the print information is transmitted to make a startup, the state may transit directly from the sleep mode to the warm-up mode.

Since the warm-up mode has a state that the image processing apparatus 10 may rapidly process a job, the maximum power consumption amount is generated out of each mode. However, for example, by using an IH heater as a heater in a fixing unit, the time of the warm-up mode is set relatively shorter than that of the heater using a halogen lamp.

As the warm-up operation is terminated by the warm-up mode, the image processing apparatus 10 transits to the standby mode.

In the standby mode, literally, "ready to process a job," the image processing apparatus 10 has a state that the image processing operation can be immediately executed.

For this reason, if the job execution manipulation is made from the key input, the operational state of the image processing apparatus 10 transits to the running mode, and the image processing based on the instructed job will be made.

If the image processing is terminated (when multiple successive jobs are awaited, all of the successive jobs are terminated), the operational state of the image processing apparatus 10 transits to the standby mode by the standby trigger. In addition, the process may be made such that time counting is initiated using the system timer after the image processing, and the standby trigger is output after a predetermined time period so as to transit to the standby mode.

If the job execution instruction is made in the middle of the standby mode, the state transits to the running mode again. When the halt-down trigger is detected, or a predetermined time period elapses, the state transits to the sleep mode.

The halt-down trigger may include manipulation of the power-saving control button 36 and the like. In addition, the system timer may be used together.

In addition, mode state transition in actual operations of the image processing apparatus 10 may not always follow the time sequence shown in the timing chart. For example, the processing of the standby mode after the warm-up mode may stop, and the process may advance to the sleep mode.

Here, each device operated by receiving power is capable of immediately executing each process by transiting from the sleep mode in FIG. 5 through the awake mode and the warm-up mode to the standby mode.

In this manner, the state of the image processing apparatus 10 according to an exemplary embodiment of the invention transits between each mode, and the power supply amount is different between each mode.

In the image processing apparatus 10 according to an exemplary embodiment of the invention, the state transits to the sleep mode if a predetermined condition is satisfied (for example, based on mobile body (user) move-out information by the motion sensor 30 or the halt-down trigger output caused by time-up of the system timer). In this sleep mode, supply of power is cutoff for the main controller 200 and the UI touch panel 216 excluding the power-saving monitoring/control unit 24 as well as each device of the facsimile communication control circuit 236, the image reading unit 238, and the image forming unit 240.

(Power Supply Control in Manipulation of Power-saving Control Button)

According to an exemplary embodiment of the invention, as the state transits to the standby mode, the system timer is activated. If a predetermined time period set in the system timer elapses, the state automatically transits to the sleep mode.

Meanwhile, as the power-saving control button 26 is manually manipulated (for example, pressed) separately from that transition to the sleep mode using the system timer, the state immediately transits to the sleep mode compulsorily regardless of the timer time of the aforementioned system timer.

Figure 7:
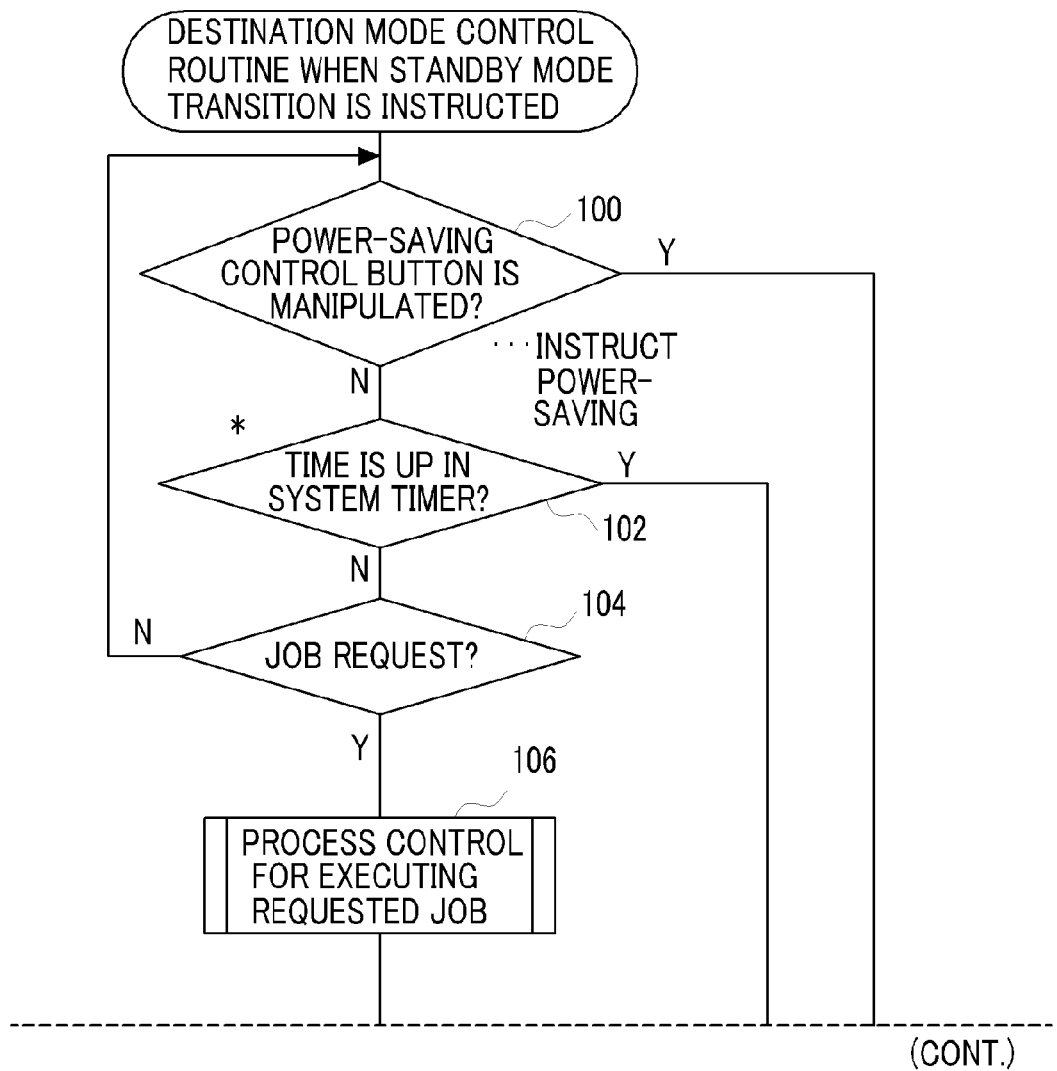
FIG. 7 is a flow chart illustrating an execution-destination mode control routine when transition to a sleep mode is instructed.

FIG. 7 is a flowchart illustrating a transition destination mode control routine depending on a condition (an execution condition for a job before the sleep mode transition instruction, a user detection condition of the second motion sensor 30, and the like) when the transition to the sleep mode from the standby mode and the like is instructed.

In step S100, it is determined whether or not the power-saving control button 26 is manipulated (in this case, the "power-saving instruction" is manipulated). If NO is determined in step 100, the process advances to step 102 so that it is determined whether or not time is up in the system timer. If NO is determined in step 102, the process advances to step 104 so that it is determined whether or not there is a new job request. If NO is determined in step 104, the process returns to step 100. This process is repeated until YES is determined in any one of steps 100, 102, and 104.

If YES is determined in step 104, the process advances to step 106 in order to execute a new job so that a process control for executing the request job is made, and the routine is terminated.

In addition, if YES is determined in step 100, the process advances to step 110 after the execution delay process (for example, several milliseconds) in step 108 in order to transit to the sleep mode. In addition, if YES is determined in step 102, the process advances to step 110 in order to allow the state to transit to the sleep mode.

In step 110, it is determined whether or not the mobile body is detected using the second motion sensor 30. If it is determined that the mobile body is not detected, it is determined that there is no mobile body (user) in the vicinity of the image processing apparatus 10, and the process advances to step 112 to execute the sleep mode transition control, and the process advances to step 114.

In step 114, it is determined whether or not time is up in the sensor timer. If YES is determined, the process advances to step 116 to cut off supply of power to the second motion sensor 30 to turn off the function of the second motion sensor 30. At this time point, the power is supplied only to the first motion sensor 28, and the minimum power state is maintained in the image processing apparatus 10.

Next, in step 118, it is determined whether or not the mobile body is detected using the first motion sensor 28. If it is determined that the mobile body is detected in step 118, the process advances to step 120, and power is supplied to the second motion sensor 30, the function of the second motion sensor 30 is turned on, and the process advances to step 122. In addition, if NO is determined in step 114, the process advances to step 122.

In step 122, it is determined whether or not the mobile body is detected using the second motion sensor 30. If it is determined that mobile body is not detected, the process returns to step 114. In addition, if it is determined that the mobile body is detected in step 122, the process advances to step 124, the state recovers from the sleep mode, for example, to the standby mode, and the routine is terminated.

Meanwhile, if it is determined that the mobile body is detected in the determination regarding whether or not the mobile body is detected using the second motion sensor 30 in step 110, the processing of a job is not made. However, it is determined that there is a mobile body (user) in the vicinity of the image processing apparatus 10, and the process advances to step 126 to execute the partial power-saving control.

In the partial power-saving control, first, the job that has been executed before the transition to the sleep mode is instructed is recognized. Hereinafter, matching examples between the recognized job and the processing will be listed. However, a relationship between the job and the processing is not limited thereto.

(Processing 1) When the Job is "Copy"

Supply of power to the UI touch panel 216, the image reading device (IIT) 238, and the image forming device (IOT) is cut off (powered off).

(Processing 2) When the Job is "Print" or "FAX Receipt"
Supply of power to the UI touch panel 216 and the image forming device (IOT) is cut off (powered off).
(Processing 3) When the Job is "Scan" or "FAX Transmission"
Supply of power to the UI touch panel 216 and the image reading device (IIT) 238 is cut off (powered off).

Next, in step 128, it is determined whether or not the power-saving control button 26 is manipulated (in this case, the manipulation is made for "power-saving release instruction"). If YES is determined, it is determined that a user wants to intentionally recover the function of the image processing apparatus 10, and the process advances to step 130 so that the state returns from the partial power-saving, and the routine is terminated. The mode of the recovery destination may include, for example, but not limited to, the awake mode, the low-power mode, the standby mode, and the like. However, considering that a user intentionally causes the recovery, the standby mode is desirable.

If NO is determined in step 128, the process advances to step 132, and it is determined whether or not there is a remote job request. If YES is determined in step 132, the process advances to step 134 so that processing control for executing the request job is executed, and the routine is terminated.

If NO is determined in step 132, the process advances to step 136, and it is determined whether or not the second motion sensor 30 detects the mobile body. If it is determined the mobile body is detected in step 136, it is determined that mobile body is still present in the vicinity of the image processing apparatus 10, and the process returns to step 128 while the partial power-saving state is maintained. In addition, if it is determined that the mobile body is not detected in step 136, it is determined that the mobile body recedes from the image processing apparatus 10. Since there is little possibility that the image processing apparatus 10 is used immediately, the process advances to step 112, and the sleep mode transition control is executed.

According to an exemplary embodiment of the invention, the image processing apparatus 10 is deactivated by the second motion sensor 30 without immediately transiting to the sleep mode when the state transits to the sleep mode through manipulation of the power-saving control button 26 or based on a fact that time is up in the system timer. However, for example, whether or not there is a user who extracts, checks, or arranges copy sheets is determined. If there is the user, the partial power-saving is executed as necessary. Therefore, it is possible to improve energy-saving in comparison with a case where power is supplied to the entire image processing apparatus 10 and ensure a convenience of a user who exists in the vicinity of the image processing apparatus 10. Therefore, it is possible to make a satisfaction both energy-saving and convenience.

In the time period for which YES is determined in step 136, convenience is more emphasized by using the partial power-saving instead of the perfect sleep mode. However, the invention may be configured such that this time of YES determination is counted, the function of the first motion sensor 28 and the second motion sensor 30 are temporarily halted, and the process compulsorily advances to step 112 so that the state transits to the sleep mode even when the mobile body is detected if a predetermined time elapses.

Here, since the functions of the first and second motion sensors 28 and 30 are temporarily halted, the sleep recovery (transition from the sleep mode to the standby mode, and the like) is not performed even when the state transits to the sleep mode, and a user exists. In addition, in a case where functions of the first and second motion sensors 28 and 30 are temporarily halted as described above, the power-saving control button 26 may be applied for the sleep recovery. For example, during the time period for which the functions of the first and second motion sensors 28 and 30 are temporarily halted, the display configuration may be modified different from the typical control state for which the first and second motion sensors 28 and 30 are operated. For example, the pilot lamp of the power-saving control button 26 may be turned on.

In addition, after the sleep recovery from the temporary halt state is made for the first and second motion sensors 28 and 30, a typical control state is recovered by releasing/confirming release of the temporary halt of the functions of the first and second motion sensors 28 and 30.

In addition, the predetermined time for compulsorily transiting to the sleep mode by temporarily halting the functions of the first and second motion sensors 28 and 30 even when the mobile body is detected may be, for example, variable or may be appropriately adjusted by a user from approximately 0 minutes (similar to that of processing in FIG. 7) to 30 minutes. In this case, it is desirable that the adjustment value (that is, a default value) at the time of shipment may be set to 0 minutes (in terms of energy-saving), 30 minutes (in terms of convenience), or 5 to 10 minutes (in terms of a satisfaction both convenience and energy-saving).

Instead of the time setting, a three-stage switch and the like for switching between settings for convenience, energy-saving, a satisfaction both convenience and energy-saving may be provided. Variable control capable of learning depending on the use condition of the image processing apparatus 10 may be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control apparatus comprising:
a plurality of processing units configured to be activated when power is supplied from a power supply unit to execute a predetermined process;
a mobile body detection unit that detects a mobile body including a user who uses a processing unit from among the plurality of processing units based on a position of the processing unit;
a determination unit that determines a presence or an absence of the mobile body confronting the processing unit based on a signal output from the mobile body detection unit;
a transition unit that controls the processing unit to transition to a powered-on state in which the processing unit receives power from the power supply unit when the determination unit determines that the mobile body is present and to a powered-off state in which the processing unit does not receive power from the power supply unit when the determination unit determines that the mobile body is absent;
a mobile body confirmation unit that confirms the presence or the absence of the mobile body from the mobile body detection unit when a request for transition from the powered-on state to the powered-off state for the transition unit is received; and a controller that controls the transition unit such that all of the processing units transition to the powered-off state when a result of confirmation in the mobile body confirmation unit indicates the absence of the mobile body and controls the transition unit such that the states of the plurality of processing units selectively and individually transition to the powered-off state when the result of the confirmation in the mobile body confirmation unit indicates the presence of the mobile body.

2. The power supply control apparatus according to claim 1, wherein the transition unit controls the processing unit to transition based on the request to transition from the powered-on state to the powered-off state, the request including at least one of from among a manipulation of a manipulation unit for instructing the transition from the powered-on state to the powered-off state and a time-counting operation of a time counter for instructing the transition to the powered-off state when no instruction for activating the processing unit is received for a predetermined time after processing of the processing unit is terminated.

3. The power supply control apparatus according to claim 1, wherein the transition unit controls the processing unit to transition based on a request to transition from the powered-on state to the powered-off state, the request including at least one from among a manipulation of a manipulation unit for instructing the transition from the powered-on state to the powered-off state and a time-counting operation of a time counter for instructing the transition to the powered-off state when no instruction for activating the processing unit is received for a predetermined time after processing of the processing unit is terminated.

4. The power supply control apparatus according to claim 2, wherein the transition unit controls the processing unit to transition based on a request to transition from the powered-on state to the powered-off state, the request including at least one from among a manipulation of a manipulation unit for instructing the transition from the powered-on state to the powered-off state and a time-counting operation of a time counter for instructing the transition to the powered-off state when no instruction for activating the processing unit is received for a predetermined time after processing of the processing unit is terminated.

5. The power supply control apparatus according to claim 1, wherein processing units activated before execution of the controller from among the plurality of processing units are selectively transitioned to the powered-off state by the controller.

6. The power supply control apparatus according to claim 2, wherein processing units activated before execution of the controller from among the plurality of processing units are selectively transitioned to the powered-off state by the controller.

7. The power supply control apparatus according to claim 3, wherein processing units activated before execution of the controller from among the plurality of processing units are selectively transitioned to the powered-off state by the controller.

8. The power supply control apparatus according to claim 4, wherein processing units activated before execution of the controller from among the plurality of processing units are selectively transitioned to the powered-off state by the controller.

9. The power supply control apparatus according to claim 1, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

10. The power supply control apparatus according to claim 2, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

11. The power supply control apparatus according to claim 3, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

12. The power supply control apparatus according to claim 4, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

13. The power supply control apparatus according to claim 5, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

14. The power supply control apparatus according to claim 6, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

15. The power supply control apparatus according to claim 7, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

16. The power supply control apparatus according to claim 8, wherein the controller disregards the result of the confirmation in the mobile body confirmation unit indicating the presence of the mobile body and all of the processing units are compulsorily powered off after a predetermined time elapses after the controller causes the processing units to selectively transition to the powered-off state.

17. The power supply control apparatus according to claim 1, wherein the powered-off state includes at least a sleep mode in which power is supplied to a control system necessary in operation and detection of the mobile body detection unit, and the powered-on state includes at least a standby mode in which power immediately suppliable to the processing unit is prepared, a running mode in which normal power is supplied, and a low-power mode in which power consumption is maintained to be lower than that of the standby mode and higher than that of the sleep mode.

18. The power supply control apparatus according to claim 2, wherein the powered-off state includes at least a sleep mode in which power is supplied to a control system necessary in operation and detection of the mobile body detection unit, and the powered-on state includes at least a standby mode in which power immediately suppliable to the processing unit is prepared, a running mode in which normal power is supplied, and a low-power mode in which power consumption is maintained to be lower than that of the standby mode and higher than that of the sleep mode.

19. An image processing apparatus comprising:
the power supply control apparatus according to claim 1,
wherein the processing unit includes at least one of:
an image reading unit that reads an image from a document image;
an image forming unit that forms an image on recording paper based on image information;
a facsimile communication control unit that transmits an image to a transmission destination under a mutually predetermined communication sequence;
a user interface unit that notifies a user who is a part of the mobile body of receipt of information; and
a user identification device for identifying the user, and
wherein image processing is executed in cooperation based on an instruction from the user, and the mobile body detection unit is installed by setting an installation position of the user interface unit or the user identification device.

20. A non-transitory computer readable medium storing a power supply control program causing a computer to perform:
detecting a mobile body including a user who uses a processing unit of a plurality of processing units based on a position of the processing unit;
determining a presence or an absence of the mobile body confronting the processing unit based on the detecting;
transitioning the processing unit to a powered-on state in which the processing unit receives power from the power supply unit when the determining determines that the mobile body is present and to a powered-off state in which the processing unit does not receive power from the power supply unit when the determining determines that the mobile body is absent; and
confirming the presence or the absence of the mobile body from the detecting when there is a transition from the powered-on state to the powered-off state during the transitioning,
wherein the transitioning is performed such that states of all of the processing units transition to the powered-off state when a result of the confirming indicates the absence of the mobile body and the transitioning is performed such that the states of the plurality of processing units selectively and individually transition to the powered-off state when a result of the confirming indicates the presence of the mobile body.

* * * * *